United States Patent [19]

Weder et al.

[11] Patent Number: 5,373,943

[45] Date of Patent: * Dec. 20, 1994

[54] PACKAGING FOR WRAPPING A FLORAL GROUPING WITH A WRAP HAVING A WRAP OPENING

[75] Inventors: David A. Weder; Donald E. Weder, both of Highland, Ill.

[73] Assignee: Highland Supply Corporation, Highland, Ill.

[*] Notice: The portion of the term of this patent subsequent to Apr. 27, 2010 has been disclaimed.

[21] Appl. No.: 165,215

[22] Filed: Dec. 10, 1993

Related U.S. Application Data

[60] Continuation of Ser. No. 40,330, Mar. 30, 1993, Pat. No. 5,311,991, which is a division of Ser. No. 906,089, Jun. 29, 1992, Pat. No. 5,205,108.

[51] Int. Cl.$^5$ ............................................. B65D 85/50
[52] U.S. Cl. ............................................. 206/423; 47/84; 229/87.01
[58] Field of Search ............... 206/423; 383/72, 74; 47/66, 72, 84; 53/397, 444, 465

[56] References Cited

U.S. PATENT DOCUMENTS

| | | | |
|---|---|---|---|
| 1,174,593 | 3/1916 | McClurg | 53/462 |
| 2,247,191 | 6/1941 | Endres | 206/423 |
| 2,248,687 | 7/1941 | Nakahiro | 53/594 |
| 2,371,985 | 3/1945 | Freiberg | 53/465 X |
| 2,781,811 | 2/1957 | Dilar et al. | 206/423 |
| 3,052,063 | 9/1962 | Dunn | 47/72 |
| 3,271,922 | 9/1966 | Wallerstein et al. | 53/3 |
| 3,376,666 | 4/1968 | Leonard | 206/423 |
| 3,508,372 | 4/1970 | Wallerstein et al. | 53/3 |
| 4,091,925 | 5/1978 | Griffo et al. | 206/423 |
| 4,333,267 | 6/1982 | Witte | 206/423 |
| 4,384,604 | 5/1983 | DeLaura et al. | 206/423 |
| 4,601,156 | 7/1986 | Parry et al. | 53/399 |
| 4,733,182 | 9/1988 | Weder et al. | 47/72 |
| 4,733,521 | 3/1988 | Weder et al. | 56/580 |
| 4,765,464 | 8/1988 | Ristvedt | 53/465 X |
| 4,799,520 | 1/1989 | Blackburn et al. | 206/423 |
| 4,801,014 | 1/1989 | Meadows | 206/423 |
| 4,970,844 | 11/1990 | Domenichiello | 53/434 X |
| 4,989,396 | 2/1991 | Weder et al. | 53/399 X |
| 5,005,760 | 4/1991 | van den Hoogan | 206/423 |
| 5,111,638 | 5/1992 | Weder | 53/397 |
| 5,181,364 | 1/1993 | Weder | 53/397 |
| 5,205,108 | 4/1993 | Weder et al. | 53/397 |
| 5,239,775 | 8/1993 | Landau | 206/423 |

FOREIGN PATENT DOCUMENTS

| | | | |
|---|---|---|---|
| 0556418 | 8/1993 | European Pat. Off. | 47/72 |
| 2643049 | 8/1990 | France | 206/423 |
| 0560532 | 4/1975 | Switzerland | 47/72 |

OTHER PUBLICATIONS

"The Simple Solution For Those Peak Volume Periods", Highland Supply Speed Cover® Brochure, 1989©, 6 pages.

"Speed Sheets® And Speed Rolls", Highland Supply Speed Sheets® Brochure, 1990©, 2 pages.

Primary Examiner—Jimmy G. Foster
Attorney, Agent, or Firm—Dunlap, Codding & Lee

[57] ABSTRACT

A wrap having a wrap opening formed through a portion thereof for wrapping a floral grouping having a bloom end and a stem end. The stem end of the floral grouping is inserted through the wrap opening in the wrap and the wrap is formed about the floral grouping and encompasses a substantial portion of the floral grouping while a portion of the stem end of the floral grouping remains extended through the wrap opening in the wrap. In one embodiment, the wrap includes an adhesive or cohesive or drawstring or the like for cooperating to secure the wrap tightly wrapped about the stem end of the floral grouping and for cooperating to secure the wrap wrapped about the floral grouping.

6 Claims, 2 Drawing Sheets

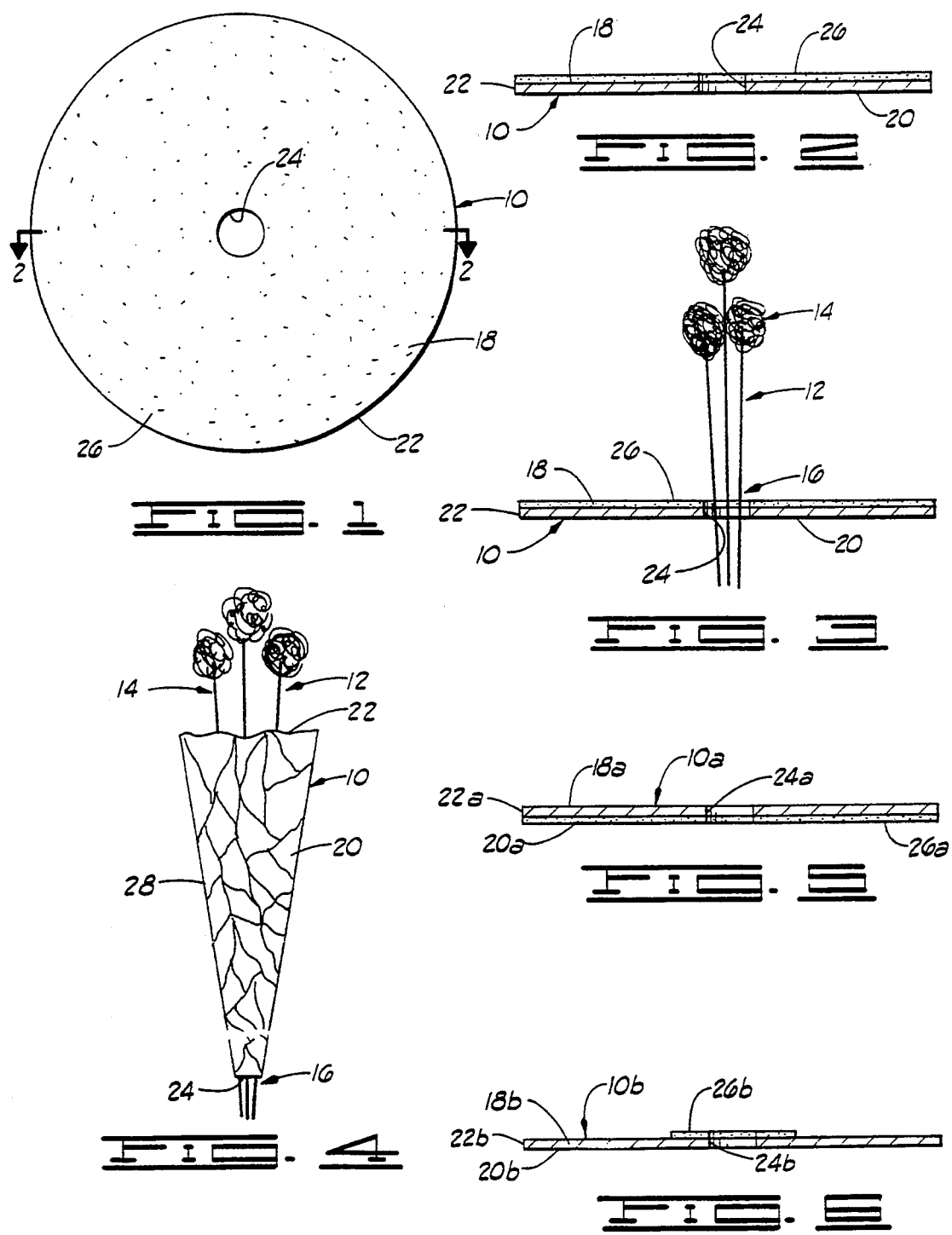

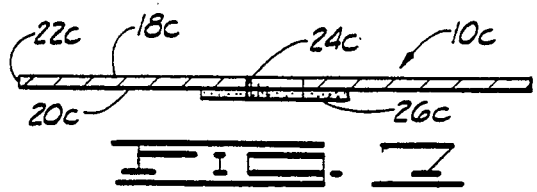
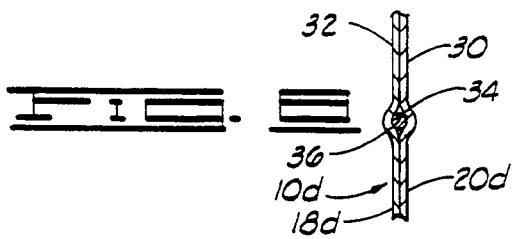
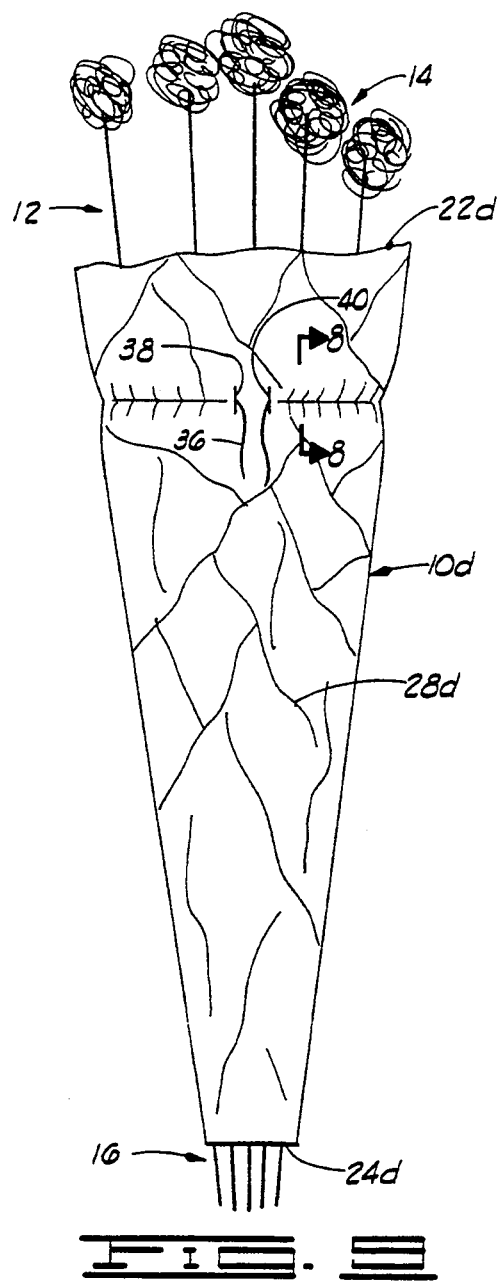
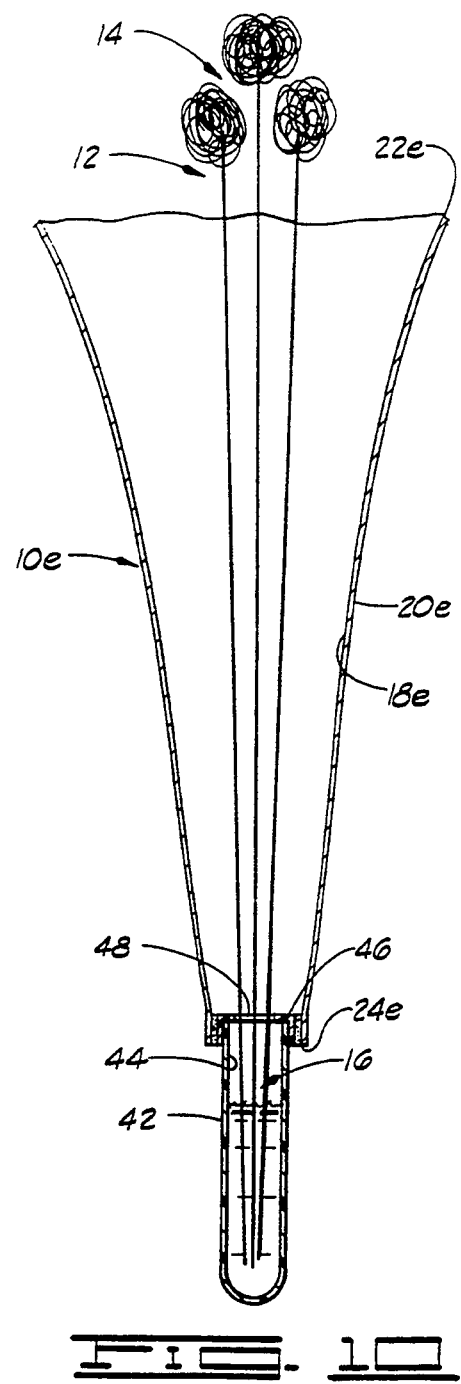

5,373,943

PACKAGING FOR WRAPPING A FLORAL GROUPING WITH A WRAP HAVING A WRAP OPENING

RELATED REFERENCES

This application is a continuation of U.S. Ser. No. 08/040,330, filed Mar. 30, 1993, entitled "A PACKAGING FOR WRAPPING A FLORAL GROUPING WITH A WRAP HAVING A WRAP OPENING", U.S. Pat. No. 5,311,991 which is a division of U.S. Ser. No. 07/906,089, filed Jun. 29, 1992, now U.S. Pat. No. 5,205,108.

FIELD OF THE INVENTION

The present invention relates to a wrap for a floral grouping and a method for wrapping a floral grouping with such wrap and, more particularly, but not by way of limitation, to a wrap having a wrap opening formed through a portion thereof wherein a stem end of the floral grouping is extended through the wrap opening and the wrap then is wrapped about the floral grouping.

BRIEF DESCRIPTION OF THE DRAWINGS

FIG. 1 is a plan view of the upper surface of a wrap constructed in accordance with the present invention.

FIG. 2 is a sectional view of the wrap of FIG. 1, taken substantially along the lines 2—2 of FIG. 1.

FIG. 3 is a sectional view of the wrap of FIGS. 1 and 2 showing a floral grouping having the stem end thereof initially inserted through a wrap opening in the wrap.

FIG. 4 is a view of the wrap of FIGS. 1, 2 and 3 showing the wrap formed and wrapped about the floral grouping.

FIG. 5 is a sectional view of a wrap similar to that shown in FIG. 3, except the modified wrap shown in FIG. 5 has adhesive on the opposite surface of the wrap as compared to the surface of the wrap having the adhesive thereon shown in FIGS. 1 through 4.

FIG. 6 is a sectional view of another modified wrap, similar to FIGS. 2 and 5, except the wrap shown in FIG. 6 has adhesive on only a portion of the upper surface thereof.

FIG. 7 is a sectional view of still another modified wrap, similar to FIG. 6, but the modified wrap shown in FIG. 7 has adhesive on only a portion of the lower surface thereof.

FIG. 8 is a sectional view of a wrap constructed exactly like the wrap shown in FIG. 6, except the modified wrap show in FIG. 8 comprises two sheets of material having a draw string laminated therebetween.

FIG. 9 is a perspective view of the wrap of FIG. 8 shown wrapped or formed about a floral grouping.

FIG. 10 is a sectional view showing the wrap of FIGS. 1 through 4 or FIG. 5 or FIG. 6 or FIG. 7 or FIG. 8 wrapped about a floral grouping and having a portion of the wrap connected to a water vase.

DESCRIPTION OF THE PREFERRED EMBODIMENTS

The present invention relates to a packaging comprising a wrap 10 (FIGS. 1, 2, 3 and 4) for wrapping a floral grouping 12 (FIGS. 3 and 4) having a bloom end 14 and a stem end 16. The wrap 10 has an upper surface 18 (FIGS. 1, 2 and 3) and a lower surface 20 (FIGS. 2, 3 and 4). The wrap 10 also has an outer periphery 22 (FIGS. 1-4).

As shown in FIGS. 1–4, the wrap 10 is generally circularly shaped. However, the wrap 10 may be rectangularly shaped or square shaped or any other geometric shape.

The wrap 10 is constructed of a sheet of material or a plurality of sheets of material where the sheets of material are laminated to each other or laid or disposed simply one on top of the other. The wrap 10 may be constructed from a variety of materials. The wrap 10 is constructed from any substantially flat, flexible suitable sheet of material that is capable of being wrapped about the floral grouping 12. Preferably, the wrap 10 is constructed of paper (untreated or treated in any manner), cellophane, foil, man-made organic polymer film, fabric (natural or synthetic), burlap, cling material, denim or combinations thereof.

The term "man-made organic polymer film" means a man-made resin such as a polypropylene as opposed to naturally occurring resins such as cellophane.

A man-made organic polymer film is relatively strong and not as subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention provided such films are substantially flexible and can be made in a sheet-like format for wrapping purposes consistent with the present invention. For example, one man-made organic polymer film is a polypropylene film.

A decorative pattern, such as a color and/or an embossed pattern, and/or other decorative surface ornamentation may be applied to the upper surface 18 and/or the lower surface 20 of the wrap 10 or portions thereof including, but not limited to printed design, coatings, colors, flocking or metallic finishes. The wrap 10 also may be totally or partially clear or tinted transparent material.

The wrap 10 may be constructed of a single layer of material or a plurality of layers of the same or different types of materials. Any thickness of the wrap 10 may be utilized in accordance with the present invention as long as the wrap 10 is wrappable about the floral grouping 12 as described herein. Additionally, an insulating material such as bubble film, preferable as one of two layers, can be utilized in order to provide needed protection for the floral grouping 12. In a preferred embodiment, the wrap 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 30.0 mils, and more preferably to about 10.0 mils.

"Floral grouping" as used herein means cut fresh flowers, artificial flowers, other fresh and/or artificial plants or other floral materials and may include other secondary plants and/or ornamentation which add to the aesthetics of the overall floral grouping 12. The term "floral grouping" as used herein also is intended to include a single flower or plant.

"Cling Wrap or Material" as used herein means any material which is capable of connecting to the sheet of material and/or itself upon contacting engagement during the wrapping process and is wrappable about the floral grouping 12 whereby portions of the cling material contactingly engage and connect to other portions of the wrapping material for generally securing the wrap 16 wrapped about at least a portion of the floral grouping 12. This connecting engagement is preferably temporary in that the wrap 10 may be easily removed without tearing same, i.e., the cling material "clings" to the wrap 10. A wrapping material which remains securely connected to and about the wrapped item until the wrapping material is torn therefrom.

The cling material is constructed and treated if necessary, from polyethylene such as Cling Wrap made by GladN, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

A wrap opening 24 (FIGS. 1-4) is formed through a portion of the wrap 10. More particularly, the wrap opening 24 is formed through a central portion of the wrap 10. The wrap opening 24 intersects the upper and lower surfaces 18 and 20 of the wrap 10 and is spaced a distance from the outer periphery 22.

A bonding material 26 which may be an adhesive or cohesive material is applied to a portion of the upper surface 18 of the wrap 10. As shown in FIGS. 1, 2 and 3, the bonding material 26 is applied substantially to the entire upper surface 18 of the wrap 10. The bonding material 26 can be applied to the wrap 10 in strips or spots and may cover only a portion of the upper and/or lower surfaces 18 and 20. The thickness of the bonding material 26 is exaggerated in FIGS. 1-3 for illustration purposes.

In operation, the stem end 16 of the floral grouping 12 is inserted through the wrap opening 24 to a position wherein a portion of the stem end 16 extends through the wrap opening 24 and a distance beyond the lower surface 20 of the wrap 18. The wrap 10 then is formed about the floral grouping 12 with the upper surface 18 of the wrap 10 being disposed near the floral grouping 12 and the wrap 10 encompassing a substantial portion of the floral grouping 12 while a portion of the stem end 16 of the floral grouping 12 remains extended through the wrap opening 24, as shown in FIG. 4. In one preferred form, the wrap 10 will substantially encompass the bloom end 14 of the floral grouping 12, although the bloom end 14 is shown in FIG. 4 extended above the wrap 10 for illustration purposes. It should be noted that, in some applications, the bloom end 14 of the floral grouping 12 may extend upwardly beyond the wrap 10, as shown in FIG. 4.

Preferably, the wrap 10 is tightly folded or wrapped about the stem end 16 of the floral grouping 12 and portions of the wrap 10 with the bonding material 26 thereon are brought into contact and bonded with other portions of the wrap 10 having the bonding material 26 thereon for cooperating to secure the wrap 10 tightly wrapped about the stem end 16 of the floral grouping 12. Further, as the wrap 10 is formed about the bloom end 14 of the floral grouping 12, portions of the wrap 10 having the bonding material 26 thereon are brought into contact and bonded with adjacent portions of the wrap 10 with the bonding material thereon to form bonded overlapping folds 28 to secure the wrap 10 loosely wrapped about the bloom end 14 of the floral grouping 12. Portions of the bonding material 26 also are brought into contact with and bonded with portions of the stem end 16 of the floral grouping 12 thereby bonding the wrap 10 to the floral grouping 12 generally about a portion of the stem end 16 for securing the wrap 10 to the floral grouping 12 and for substantially preventing the floral grouping 12 from sliding or moving within or out from the wrap 10. The overlapping folds 28 are formed by portions of the wrap 10 overlapping and engaging adjacent portions of the wrap 10 with the bonding material 26 bonding the overlapping and adjacent portions.

EMBODIMENT OF FIG. 5

Shown in FIG. 5 is a modified wrap 10a which is constructed exactly like the wrap 10 shown in FIGS. 1-4 and described in detail before, except the bonding material 26a is disposed on the lower surface 20a of the wrap 10a. The wrap 10a is wrapped about the floral grouping in a manner exactly like that described before with respect to the wrap 10, except the bonding material 26a will not bond to the stem end 16 of the floral grouping 12. Rather, overlapping folds like the overlapping folds 28 are formed in the wrap 10a generally about the stem end 16 and the overlapping folds cooperate to secure the wrap 10a tightly wrapped about the stem end 16.

EMBODIMENT OF FIG. 6

Shown in FIG. 6 is a wrap 10b which is constructed exactly like the wrap 10 shown in FIGS. 1-4, except the bonding material 26b on the upper surface 18b of the modified wrap 10b is disposed adjacent the wrap opening 24b with the bonding material 26b extending a distance from the wrap opening 24b. The wrap 10b is wrapped about the floral grouping in a manner exactly like that described before with respect to the wrap 10 with the bonding material 26b cooperating to tightly secure the wrap 10b about the stem end 16 of the floral grouping 12, except the overlapping folds formed in the wrap 10b extending generally about the bloom end 14 of the floral grouping 12 are not bonded since the bonding material 26b does not extend to the outer periphery 22b. The bonding material 26b extends only from the wrap opening 24b a distance outwardly toward the outer periphery 22b and is spaced a distance from the outer periphery 22b.

EMBODIMENT OF FIG. 7

Shown in FIG. 7 is a wrap 10c constructed exactly like the wrap 10b shown in FIG. 6, except the bonding material 26c is disposed on the lower surface 20c of the wrap 10c.

EMBODIMENT OF FIGS. 8 AND 9

Shown in FIGS. 8 and 9 is another modified wrap 10d, the wrap 10d being only partially shown in FIG. 8. The wrap 10d is constructed exactly like the wrap 10b (FIG. 6) or the wrap 10c (FIG. 7) except the wrap 10d specifically comprises two sheets of material 30 and 32 (FIG. 8) laminated together with an opening 34 being formed between the two sheets of material 30 and 32 near and spaced a distance from the outer periphery 22d of the wrap 10d and with a drawstring 36 extending through the opening 34 between the two sheets of material 30 and 32 and with the opposite ends of the drawstring 36 extending outwardly through openings 38 and 40 in the wrap 10d, as shown in FIG. 9.

In this embodiment, the wrap 10d is tightly wrapped about the stem end 16 and secured thereto via the bonding material 26b or 26c in a manner exactly like that described before. The wrap 10d is loosely secured about the bloom end 14 of the floral grouping 12 by pulling the drawstring 36 and then tying the drawstring 36 after the wrap 10d has been loosely gathered and secured about the bloom end 14 of the floral grouping 12.

EMBODIMENT OF FIG. 10

Shown in FIG. 10 is a wrap 10e which is constructed exactly like the wrap 10, 10a, 10b, 10c or 10d described in detail before except a water vase 42 is secured to the wrap opening 24e. The water vase 42 has an opening 44 for receiving and accommodating water and a cap 46 with a cap opening 48 formed therein secured to an upper end of the water vase 42. The cap 46 is constructed of a flexible material preferably.

The water vase 42 may be secured to the wrap 10e prior to forming the wrap 10e about the floral grouping 12 or the wrap 10e may be secured to the water vase 42 during the wrapping operation.

In those instances where the water vase 42 is secured via the bonding material (not shown) to the wrap 10e with the opening 44 of the water vase 42 being aligned with the wrap opening 24e, the stem end 16 of the floral grouping 12 is inserted through the wrap opening 24e, through the cap opening 48 and into the opening 44 in the water vase 42 with the stem end 16 being secured to the wrap 10e via the engagement with the cap 46. The wrap 10e then is wrapped about the bloom end 14 and loosely secured thereabout in the manners described before.

In those instances where the wrap 10e is not initially connected to the water vase 42e, the stem end 16 of the floral grouping 12 initially is inserted through the cap opening 48 and into the opening 44 of the water vase 42. Then, the water vase 42 along with the floral grouping 12 is inserted through the wrap opening 24e and the wrap 10e to a position wherein a portion of the water vase 42 along with a portion of the stem end 16 of the floral grouping 12 extends through the wrap opening 24e and extends a distance beyond the lower surface 20e of the wrap 10e. In this position, the wrap 10e is tightly secured to the water vase 42 via the bonding material (not shown) and the wrap 10e is loosely wrapped and secured about the bloom end 14 of the floral grouping 12 in any one of the manners described before.

Changes may be made in the construction in the operation of the various components, elements and assemblies of the wrap described herein and changes may be made in the steps or the sequence of steps of the methods described herein without departing from the spirit and the scope of the invention as defined in the following claims.

What is claimed is:

1. A packaging comprising:
 a floral grouping having a bloom end and a stem end; and
 a wrap having an upper surface and a lower surface and an outer periphery, the wrap having a wrap opening being formed through a portion of the wrap intersecting the upper and the lower surfaces of the wrap and being spaced a distance from the outer periphery of the wrap, the wrap provided with a bonding material on a portion of one of the upper and the lower surfaces of the wrap, the stem end of the floral grouping being inserted through the wrap opening to a position wherein the stem end of the floral grouping extends a distance beyond the lower surface of the wrap and the wrap being formed about the floral grouping with the upper surface of the wrap being disposed near the floral grouping and the wrap encompassing a substantial portion of the floral grouping while a portion of the stem end of the floral grouping remains extended through the wrap opening, the portion of the wrap with the bonding material thereon being brought into contact and bonded with other portions of the wrap for forming bonded overlapping folds cooperating to secure the wrap about the floral grouping.

2. The packing of claim 1 wherein the wrap is defined further as being constructed of a substantially flat, flexible sheet of material.

3. The packaging of claim 1 wherein the wrap is further defined as being constructed of a sheet of material selected from a group of materials consisting of paper (untreated or treated), cellophane, foil, man-made organic polymer film, fabric (natural or synthetic), burlap, claim material, denim or combinations thereof.

4. The packaging of claim 1 wherein the wrap opening is formed through a central portion of the wrap.

5. The packaging of claim 1 wherein the wrap has a thickness in a range from less than about 1.0 mils to about 30.0 mils.

6. A packaging comprising:
 a floral grouping having a bloom end and a stem end;
 a water vase having an opening extending therethrough forming an open upper end and forming a space for receiving and accommodating water; and
 a wrap having an upper surface, a lower surface and an outer periphery, the wrap having a wrap opening formed through a portion of the wrap intersecting the upper and the lower surfaces of the wrap and spaced a distance from the outer periphery of the wrap, the wrap having bonding material disposed thereon, the stem end of the floral grouping being inserted through the wrap opening to a position wherein the stem end of the floral grouping extends a distance beyond the lower surface of the wrap and the wrap being formed about the floral grouping with the upper surface of the wrap being disposed near the floral grouping and the wrap encompassing a substantial portion of the floral grouping while a portion of the stem end of the floral grouping remains extended through the wrap opening, the stem end of the floral grouping being inserted through the open upper end of the water vase and the wrap being formed about a portion of the water vase and bonded to the water vase via the bonding material disposed on the wrap.

* * * * *

UNITED STATES PATENT AND TRADEMARK OFFICE
CERTIFICATE OF CORRECTION

PATENT NO. : 5,373,943

DATED : December 20, 1994

INVENTOR(S) : Weder et al.

It is certified that error appears in the above-indentified patent and that said Letters Patent is hereby corrected as shown below:

Column 3, line 12, please delete "wrap 16" and substitute therefor -- wrap 10 --.

Column 3, line 53, please delete "wrap 18" and substitute therefor -- wrap 10 --.

Column 5, line 50, please delete "vase 42e" and substitute therefor -- vase 42 --.

Column 6, line 29, please delete "packing" and substitute therefor -- packaging --.

Signed and Sealed this

Twenty-third Day of May, 1995

Attest:

BRUCE LEHMAN

Attesting Officer      Commissioner of Patents and Trademarks